Patented Jan. 23, 1945

2,367,791

UNITED STATES PATENT OFFICE 2,367,791

VITAMIN COMPOSITION AND METHOD OF OBTAINING SAME

Hervey C. Parke and Elmer J. Lawson, Detroit, Mich., assignors to Parke, Davis & Company, Detroit, Mich., a corporation of Michigan No Drawing. Application May 26, 1941, Serial No. 395,313

11 Claims. (Cl. 260—534)

This invention relates to vitamin compositions and methods of obtaining the same. More particularly, it relates to new vitamin compositions having the activity of pantothenic acid.

Pantothenic acid is a universal growth factor which occurs, although in relatively small amounts, in variety of materials of which liver represents the richest natural source. This vitamin has the strucural formula,

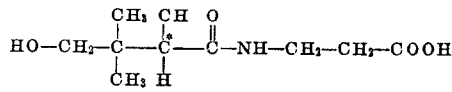

where the carbon atom marked with an asterisk (*) is optically active. Of the two possible enantimorphous forms, only the dextrorotatory fo·m (+), i. e. d-pantothenic acid, is active.

Since pantothenic acid, as well as all of its common therapeutically useful derivatives, is extremely soluble in water, its isolation from natural sources such as liver is commercially impractical. Accordingly, many attempts have been made to obtain a practical method for preparing the vitamin synthetically. However, most of the syntheses employed in the past have been very complicated, and because of the highly lyophilic character of the vitamin, the obtainment of the vitamin in pure form has been tedious and difficult. The problem has been further complicated by the fact that heretofore no crystalline therapeutically useful derivatives of pantothenic acid have been known and the products have been either microcrystalline powders or amorphous glasses. In such products the purity could not be definitely ascertained. These preparations have also suffered from the defect that they are highly hygroscopic and on short exposure to the atmosphere of normal humidity they absorb moisture and turn soupy. This had made the handling of pantothenic acid preparations a matter of considerable difficulty, for operation such as weighing, ampouling and so on, must be conducted in an especially dry atmosphere.

This invention has for its object the overcoming of these difficulties by providing an improved manufacture of pantothenic acid preparations, and especially, by providing for the obtainment of relatively non-hygroscopic crystalline pantothenic acid preparations free from foreign ions.

In practicing our invention, we proceed as follows:

An alkali metal salt of β-alanine is prepared, for example, by treating β-alanine with the stoichiometric amount of a strong base such as a hydroxide, oxide or alcoholate of an alkali metal. If the preparation of the alkali metal salt of β-alanine is conducted in aqueous solution, as may be the case when oxides or hydroxides are used, the water must then be removed, for example, by evaporation in vacuo. The dry alkali metal salt of β-alanine thus obtained is then reacted with an α-hydroxy-β,β-dimethyl-γ-butyrolactone in a substantially anhydrous water miscible lower aliphatic alcohol such as methanol, ethyl alcohol, isopropyl alcohol or the like. The resulting solution contains the alkali metal salt of pantothenic acid.

Especially satisfactory results are obtained when sodium d-pantothenate is prepared in this manner from sodium β-alanate and (−)-α-hydroxy-β,β-dimethyl-γ-butyrolactone. For we have discovered that the sodium d-pantothenate thus prepared may readily be crystallized from the anhydrous alcoholic solution and thus obtained in a form which offers many advantages over the previously known pantothenic acid derivatives.

It will be appreciated that our invention, therefore, comprehends a new and improved pantothenic acid derivative, namely, crystalline sodium d-pantothenate.

Crystalline sodium d-pantothenate is much less hygroscopic than pantothenic acid derivatives hitherto obtained. Since this new salt contains only the active anion and the physiologically innocuous sodium cation, it can be said to be free of any foreign anions such as calcium, quinine, or other substances which in themselves have a physiological effect. Accordingly, the new crystalline sodium d-pantothenate, in the form of a solution, is especially adapted for injection purposes.

The crystalline character of the new salt is of great advantage since such a crystaline product can be obtained in a high state of purity and when crude preparations or preparations of doubtful purity are at hand, the presence of the impurities can very readily be recognized. Thus, it is possible to impose rigid standards on this new salt thereby assuring the trade that they are obtaining a uniform, pure, and carefully standardized vitamin preparation. That is to say, the substance is a pure chemical and as such, all the rigorous crystallographic and chemical tests applicable to a pure chemical can be used in assaying this preparation. This possibility for careful standardization was not present in the previous amorphous or microcrystalline powders hitherto available to the trade. Such powders have been standardized biologically—a method known to be fraught with errors—or by determinations of optical rotatory power—a method of doubtful value when applied to non-crystalline substances.

We attribute the greatly lessened hygroscopicity of sodium d-pantothenate to its peculiar crystalline character. The crystals occur in the form of long parallel fibers. This property means that to all intents and purposes the crystals expose a surface which is different in its properties from the properties of the amorphous preparations previously known. It is well known that different faces of a crystal show different solution tendencies and it appears that the long narrow exposed surfaces in crystalline sodium d-pantothenate have less solution tendency and less hygroscopicity than is exhibited by an amorphous product.

We have observed that the reduced hygroscopicity of our crystalline sodium d-pantothenate becomes more pronounced in a highly purified product. For that reason, we are inclined to attribute the hygroscopic character of impure preparations, to the presence of impurities removed by further crystallization.

Our invention is more fully illustrated by the following examples:

Example 1

A solution of 55.5 g. of dry sodium $\beta$-alanate, 65 g. of $(-)$-$\alpha$-hydroxy-$\beta,\beta$-dimethyl-$\gamma$-butyrolactone, and 350 cc. of absolute alcohol is refluxed for three hours. While still hot, the solution is filtered through a layer of supercel and the reaction of flask and residue washed with 50 cc. of absolute alcohol. The combined filtrate and washings are cooled, seeded and allowed to stand undisturbed. In the course of several days, the mixture sets to a thick magma. This mixture is filtered, washed with a small amount of absolute alcohol and the residue dried in a vacuum desiccator. The product, crystalline sodium d-pantothenate, is purified further by recrystallization from absolute alcohol or from isopropyl alcohol and is thus obtained in the form of long matted needles.

The pure crystalline sodium d-pantothenate obtained, as described above, is much less hygroscopic than pantothenic acid derivatives hitherto obtained. It may be handled for relatively long periods in the air without becoming mushy. It is the first derivative which has been obtained in a definite macrocrystalline form.

Crystalline sodium d-pantothenate melts indefinitely at 120–140° C. Its optical rotation is $[\alpha]_D^{25} = 27.1 \pm 0.2$; $c = 5$ in water, $l = dm$. The crystals occur as clustered aggregates of long parallel fibers which are arranged in flat bundles. These bundles are both straight and curved. The fibers each represent individual crystals.

When the crystalline sodium d-pantothenate is first separated from the mother liquor, there may be impurities still present which are readily removed by recrystallization. Slightly impure samples of the crystalline sodium d-pantothenate can readily be identified under the microscope since the individual long hair-like crystals are then cemented together by this impurity which has a resinous character and is isotropic and non-crystalline. This impurity may coat the bundles of fibers and give them a brittle character. After the sodium d-pantothenate has been recrystallized, little or no impurity is present and then the crystals have a fine hair-like fluffy appearance.

Crystalline sodium d-pantothenate is probably ortho-rhombic. The crystals show parallel extinction. The plane of the optic axes is parallel to the elongation with the obtuse bisectrix perpendicular to the elongation. The index of refraction parallel to the elongation is $1.486 \pm 0.001$ and the refractive index perpendicular to the elongation is $1.464 \pm 0.003$.

Example 2

A solution of 55.5 g. of dry sodium $\beta$-alanate, 65 g. of $(-)$-$\alpha$-hydroxy-$\beta,\beta$-dimethyl-$\gamma$-butyrolactone and 350 cc. of dry isopropyl alcohol is refluxed for three hours. Then an additional 350 cc. of isopropyl alcohol is added, the solution filtered while still hot through a thin mat of supercel, cooled and seeded. After standing for some time, usually a matter of one to several days, the mixture sets to a magma in which the crystalline character of the sodium d-pantothenate is easily apparent. The crystals are collected, washed with isopropanol and dried in a vacuum desiccator. As thus obtained, the product is substantially pure and does not require further purification. The yield amounts to more than 90%.

Example 3

The new method for obtaining crystalline sodium d-pantothenate, according to this invention, may also be employed in purifying non-crystalline sodium d-pantothenate obtained according to previously known methods. This is illustrated, for example, as follows:

A mixture of 55.5 g. of dry sodium $\beta$-alanate and 65 g. of $(-)$-$\alpha$-hydroxy-$\beta,\beta$-dimethyl-$\gamma$-butyrolactone is heated with stirring in an oil bath at 120° C. After an hour the molten mixture is homogeneous and clear. The clear melt is allowed to cool to room temperature while protecting it from moisture. Thus the melt solidifies to a hard, brittle glass which may be chipped out and preserved in the form of rather large glassy lumps. For use in therapeutic preparations, however, it must be pulverized and this process is attended with considerable difficulty. If the pulverization is done in a dry atmosphere, there can be obtained a fine amorphous powder of non-crystalline sodium d-pantothenate which quickly absorbs moisture on exposure to the atmosphere of normal humidity. This is in contrast to the behavior of the crystalline sodium d-pantothenate prepared, for instance, according to Example 1 or 2.

The above product is not completely pure. The sodium d-pantothenate content may be found either by determination of the specific rotation of a sample or by bio-assay using any of the available methods such as the yeast growth method, bacterial growth method, or chick assay. The results show an average sodium d-pantothenate content of 95%, indicating 5% of impurity.

The above crude sodium d-pantothenate may be purified according to our process by recrystallization, with formation of the pure sodium d-pantothenate. To this end we proceed as follows:

The entire reaction mixture obtained, for example, as described above, and weighing about 120 g. is dissolved in 350 cc. of hot absolute ethyl alcohol by refluxing for a short time. While still hot, the solution is filtered through a thin layer of supercel or other filtering aid. Then the flasks and residue are washed with 50 cc. of absolute ethyl alcohol. The combined filtrate and washings are cooled, seeded, and set aside at room temperature for several days. At the end of this time the thick magma is filtered, washed with a small amount of absolute alcohol, and the residue dried in a vacuum desiccator. The crystalline sodium d-pantothenate thus obtained may be purified further if desired by recrystallization as above from ethyl alcohol or from isopropyl alcohol. Thus there is obtained a product assaying 100% in sodium d-pantothenate, having a considerably higher rotation than the product obtained directly from the fusion, and showing under the microscope no evidence of the presence of any impurities.

It is very easy to detect impurities in crystalline sodium d-pantothenate by examining it under the microscope, for impurities show up in the form as isotropic foreign matter readily observed under ordinary light, and vanishing when the specimen is examined between crossed nicols.

Example 4

Potassium β-alanate is prepared by dissolving β-alanate in the calculated amount of cold 20% potassium hydroxide solution. This aqueous solution is then evaporated to dryness in vacuo on a steam bath. The hard mass of potassium β-alanate thus obtained is scraped out of the flask, dried in a vacuum desiccator and pulverized while protecting it against atmospheric moisture. Potassium β-alanate is very hygroscopic and must be preserved in tightly sealed bottles.

A solution of 63.5 g. of potassium β-alanate and 65 g. of (—)-α-hydroxy-β,β-dimethyl-γ-butyrolactone, and 350 cc. of absolute ethyl alcohol is refluxed for three hours. Thus there is obtained a solution of potassium d-pantothenate. Assays of the solution either biologically or by determination of the optical rotatory power show an approximately quantitative yield. It is not possible to obtain crystalline potassium d-pantothenate from this solution by concentrating it, or by any other methods. Upon adding dry ether or dry acetone to the alcoholic solution of potassium d-pantothenate the latter is precipitated in the form of a gum. By careful partial reprecipitation from alcohol-ether an amorphous, powdery potassium d-pantothenate may be obtained. This product is extremely hygroscopic and very quickly absorbs moisture from the air.

The same product may be obtained by fusion of potassium β-alanate and (—)-α-hydroxy-β,β-dimethyl-γ-butyrolactone according to the method of Example 3. The product so obtained is not crystalline and is extremely hygroscopic.

Example 5

The solution of 55.5 g. of dry sodium β-alanate, 65 g. of racemic α-hydroxy-β,β-dimethyl-γ-butyrolactone and 35 cc. of absolute ethyl alcohol or isopropyl alcohol is refluxed for 3 hours. Thus there is obtained a solution of sodium racemic pantothenate. The yield is approximately quantitative as shown by biological assays or determinations of the optical rotatory power.

It is not possible to obtain crystalline sodium racemic pantothenate from this solution. On precipitating the sodium dl-pantothenate by addition of ether to the alcoholic solution, the product separates as a gum. By dissolving this gum in absolute alcohol and carefully fractionally precipitating it from solution by addition of dry ether, there is obtained sodium dl-pantothenate in the form of a fine amorphous powder. This powder is very hygroscopic and very difficult to handle, in contrast to the crystalline sodium d-pantothenate of Examples 1 and 2.

Instead of using sodium β-alanate or potassium β-alanate in the above examples and thereby forming sodium pantothenate or potassium pantothenate, there may be used other alkali metal salts of β-alanine such as the lithium salt, or the salt of the rarer metals such as rubidium or caesium. Also instead of using the (—)-α-hydroxy-β,β-dimethyl-γ-butyrolactone there may be employed its enantiomorph, the (+)-α-hydroxy-β,β-dimethyl-γ-butyrolactone, or the racemic (dl)-α-hydroxy-β,β-dimethyl-γ-butyrolactone. However, only in the case of the preparation of sodium d-pantothenate can a crystalline product be obtained. In other cases, the product is amorphous and is best isolated by careful fractional precipitation from the alcoholic solution by addition of a non-polar organic solvent such as ether, acetone benzene, petroleum ether, or the like.

Instead of using ethyl alcohol or isopropyl alcohol in the above examples, there may be used other water-miscible lower aliphatic alcohols such as methyl alcohol, n-propyl alcohol, or allyl alcohol. These, however, offer no advantage over the use of the cheaper alcohols employed in the examples. In any case it is important that the alcohol be entirely free from water, for the presence of more than the merest traces of water renders the crystallization of sodium d-pantothenate virtually impossible.

The above examples are also subject to certain modifications in regard to reaction times and temperature. For instance, instead of refluxing the alcoholic solution of the alkali metal salt of β-alanate and the α-hydroxy-β,β-dimethyl-γ-butyrolactone, one may heat the solution containing the reactants at any temperature in the range from 50–150° C. varying the reaction time proportionally in order to obtain complete conversion. Completeness of reaction may be ascertained either by biological assay of the solution or by determination of the optical rotatory power. At lower temperature it is necessary to heat the reaction mixture for longer periods of time. We prefer to operate at the refluxing temperature of the solution substantially as described in the examples, heating the mixture for a period of 1 to 5 hours. Longer periods of heating offer no advantage and may lead to partial racemization of the solution, while shorter periods of time may not be sufficient to insure complete reaction.

What we claim as our invention is:

1. Process for preparing vitamin compositions which comprises reacting under anhydrous conditions an alkali metal salt of β-alanine with α-hydroxy-β,β-dimethyl-γ-butyrolactone in a substantially anhydrous water-miscible lower aliphatic alcohol.

2. Process for the preparation of vitamin compositions which comprises reacting under anhydrous conditions the sodium salt of β-alanine with α-hydroxy-β,β-dimethyl-γ-butyrolactone in a water-miscible lower aliphatic alcohol.

3. Process according to claim 2 wherein the water-miscible lower aliphatic alcohol is ethyl alcohol.

4. Process according to claim 2 wherein the water-miscible lower aliphatic alcohol is isopropyl alcohol.

5. Process for preparing vitamin compositions which comprises heating under anhydrous conditions approximately equimolar amounts of the sodium salt of β-alanine and (—)-α-hydroxy-β,β-dimethyl-γ-butyrolactone in substantially anhydrous ethyl alcohol, adjusting the concentration of the resulting solution to be approximately 25-30% by weight in total solids, allowing the solution of sodium d-pantothenate in ethyl alcohol thus obtained to crystallize, and collecting the crystal crop, thereby obtaining crystalline sodium d-pantothenate.

6. Process for preparing vitamin compositions which comprises heating under anhydrous conditions approximately equimolar amounts of the sodium salt of β-alanine and (—)-α-hydroxy-β,β-dimethyl-γ-butyrolactone in substantially anhydrous isopropyl alcohol, adjusting the concentration of the resulting solution to be approximately 15-20% by weight in total solids, allowing the solution of sodium d-pantothenate in isopropyl alcohol thus obtained to crystallize, and collecting the crystal crop, thereby obtaining crystalline sodium d-pantothenate.

7. Process for obtaining crystalline sodium-d-pantothenate which comprises adjusting the concentration of a solution of sodium d-pantothenate in a substantially anhydrous water-miscible lower aliphatic alcohol to be approximately 10-40% by weight in total solids, allowing the resulting solution of sodium d-pantothenate thus obtained to crystallize, and collecting the crystal crop, thereby obtaining crystalline sodium d-pantothenate.

8. Process for obtaining crystalline sodium d-pantothenate which comprises adjusting the concentration of a solution of sodium d-pantothenate in substantially anhydrous ethyl alcohol to be approximately 25-30% by weight in total solids, allowing the solution of sodium d-pantothenate thus obtained to crystallize, and collecting the crystal crop, thereby obtaining crystalline sodium d-pantothenate.

9. Process for obtaining crystalline sodium-d-pantothenate which comprises adjusting the concentration of a solution of sodium d-pantothenate in substantially anhydrous isopropyl alcohol to be 15-20% by weight in total solids, allowing the solution of sodium d-pantothenate thus obtained to crystallize, and collecting the crystal crop, thereby obtaining crystalline sodium d-pantothenate.

10. Crystalline sodium d-pantothenate.

11. Crystalline sodium d-pantothenate, said crystalline sodium d-pantothenate showing parallel extinction, having the plane of the optic axes parallel to the elongation with the obtuse bisectrix perpendicular to the elongation, having an index of refraction parallel to the elongation of approximately 1.486±0.001, having an index of refraction perpendicular to the elongation of approximately 1.464±0.003, and appearing to the eye in the form of long matted needles.

HERVEY C. PARKE.
ELMER J. LAWSON.